(12) United States Patent
Fritsch et al.

(10) Patent No.: US 9,744,648 B2
(45) Date of Patent: Aug. 29, 2017

(54) MOUNTING WITH INTERCONNECTED CAVITIES FOR HOLDING AN ABRASIVE, METHOD FOR PRODUCING SUCH A MOUNTING, GRINDING SYSTEM AND USE OF SUCH A MOUNTING

(71) Applicant: Robert Bosch GmbH, Stuttgart (DE)

(72) Inventors: Stephan Fritsch, Frauenfeld (CH); Adrian Schoch, Warth (CH); Juerg Schnyder, Nuerensdorf (CH)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 14/564,792

(22) Filed: Dec. 9, 2014

(65) Prior Publication Data
US 2015/0158147 A1    Jun. 11, 2015

(30) Foreign Application Priority Data

Dec. 9, 2013    (DE) .......................... 10 2013 225 223

(51) Int. Cl.
| | |
|---|---|
| *B24D 9/10* | (2006.01) |
| *B24D 18/00* | (2006.01) |
| *B23P 19/04* | (2006.01) |
| *B24B 55/10* | (2006.01) |

(52) U.S. Cl.
CPC ............... *B24D 9/10* (2013.01); *B23P 19/04* (2013.01); *B24D 18/00* (2013.01); *B24D 18/0072* (2013.01); *B24B 55/10* (2013.01); *Y10T 29/49826* (2015.01)

(58) Field of Classification Search
CPC ....... B24B 23/02; B24B 55/10; B24B 55/102; B24B 55/105; B24D 9/10; B24D 18/0072
See application file for complete search history.

(56) References Cited

U.S. PATENT DOCUMENTS

| | | | | |
|---|---|---|---|---|
| 3,299,584 A * | 1/1967 | Landis | ..................... | B24D 9/10 451/494 |
| 4,759,155 A * | 7/1988 | Shaw | ................... | B24D 15/023 15/231 |
| 7,112,127 B2 * | 9/2006 | Watson | ................. | B24B 55/105 451/356 |
| 8,226,455 B2 * | 7/2012 | Berryhill | ................. | B24B 55/10 451/456 |

(Continued)

FOREIGN PATENT DOCUMENTS

DE    20 2012 008 297 U1    10/2012

*Primary Examiner* — Timothy V Eley
(74) *Attorney, Agent, or Firm* — Maginot, Moore & Beck LLP

(57) ABSTRACT

A mounting element for holding a self-adhesive and/or flexible abrasive includes a supporting plate, and a distributing body. The supporting plate includes a plurality of suction openings which penetrate the supporting plate from a first side to a second side opposite the first side. A first side of the distributing body is in contact with the second side of the supporting plate, and a second side of the distributing body is configured to hold an abrasive. The distributing body includes a plurality of cavities which penetrate the distributing body from the first side of the distributing body to the second side of the distributing body, and which are mutually separated by a plurality of walls. At least one of the walls has at least one aperture which connects at least two adjacent cavities to each other.

21 Claims, 7 Drawing Sheets

(56) References Cited

U.S. PATENT DOCUMENTS

| | | | | |
|---|---|---|---|---|
| 8,444,454 B2* | 5/2013 | Chung-Fat | ............ | B24B 45/003 |
| | | | | 451/28 |
| 2001/0005668 A1* | 6/2001 | Sandell | ................ | B24B 23/022 |
| | | | | 451/359 |
| 2006/0181159 A1* | 8/2006 | Dehde | .................... | B24B 23/02 |
| | | | | 310/51 |
| 2007/0243803 A1* | 10/2007 | Oka | ...................... | B24B 55/102 |
| | | | | 451/527 |
| 2008/0081546 A1* | 4/2008 | Takinami | ............... | B24D 11/00 |
| | | | | 451/527 |
| 2010/0015900 A1* | 1/2010 | Valentini | ................. | B24D 9/08 |
| | | | | 451/490 |
| 2014/0011433 A1* | 1/2014 | Marton | ................ | B24B 45/003 |
| | | | | 451/456 |

* cited by examiner

MOUNTING WITH INTERCONNECTED CAVITIES FOR HOLDING AN ABRASIVE, METHOD FOR PRODUCING SUCH A MOUNTING, GRINDING SYSTEM AND USE OF SUCH A MOUNTING

This application claims priority under 35 U.S.C. §119 to patent application no. DE 10 2013 336 223.4, filed on Dec. 9, 2013 in Germany, the disclosure of which is incorporated herein by reference in its entirety.

The present disclosure relates to a mounting for holding an, in particular, self-adhesive and/or flexible abrasive, in particular for holding a flexible grinding disk, a method for producing such a mounting, a grinding system comprising such a mounting, and a self-adhesive, flexible abrasive, as well as to a use of a mounting.

BACKGROUND

Mountings for abrasive are well known from the prior art. The abrasive can be configured as an exchangeable flexible grinding disk, containing a support which bears abrasive grains fixed with a bonding agent. On the side facing away from the abrasive grains, the abrasives can be of self-adhesive configuration. For this purpose, they can have, for instance, a layer of a contact adhesive (PSA, "pressure sensitive adhesive").

In many cases, it is advantageous or even essential to extract the grinding dust generated in the grinding. For this purpose, the abrasive, in particular the grinding disk, can have one or more suction openings. These can be made, for example by perforation, in a support (for instance of paper or film) which cannot be flowed through per se. Alternatively, a support, the material of which can already be flowed through per se (for example an appropriately configured textile material or an open-cell foam), can also be used.

Said mountings are used to fix such grinding disks to a grinding machine. On the side facing the abrasive, these known mountings have in some variants vinyl film which is grained in a leather-like manner and onto which the grinding disk can be glued (so-called "PSA pads"). In other variants, the mountings are configured as so-called "rubber pads", which can also be structured.

In order to enable dust to be extracted, the mountings (in particular said PSA pads) have, for example, six or seven suction openings, which fully penetrate the mounting and which through which the grinding dust can be evacuated.

The known mountings for abrasive have a number of drawbacks however. For even if the mounting and the abrasive have the same pattern of suction openings, then both parts have to be mutually aligned, which is laborious and prone to error.

SUMMARY

An object of the disclosure is to overcome these drawbacks of the prior art. In particular, a mounting which in a simple manner enables a dust extraction which is as extensive as possible should be provided. Moreover, the mounting should at the same time be as mechanically stable as possible in order to be able to withstand the forces at play in the course of the grinding.

This object is achieved, on the one hand, by a mounting according to the disclosure. The mounting is configured to hold an abrasive. The abrasive can be constituted by a self-adhesive and/or flexible adhesive, such as, for example, a flexible grinding disk. The mounting comprises:

a supporting plate having a first side and a second side situated opposite the first side, wherein the supporting plate contains a plurality of suction openings, which penetrate it from its first side to its second side;

a distributing body having a first side and a second side situated opposite the first side, wherein the first side of the distributing body is at least partially in contact with the second side of the supporting plate and the second side of the distributing body is configured to hold the abrasive.

According to the disclosure, the distributing body contains a multiplicity of cavities, which penetrate it from its first side to its second side and which are mutually separated by a multiplicity of walls. At least one wall has at least one aperture, which connects at least two adjacent cavities one to another.

Preferably, each cavity is fluidically connected to at least one suction opening directly or indirectly by at least one, preferably precisely one, aperture. By a fluidic connection is understood a configuration of the type in which the grinding dust can flow from a cavity directly or indirectly through at least one, preferably precisely one, aperture into at least one of the suction openings. This flow can be reinforced by a vacuum generated on the first side of the supporting plate. In order to be able to hold the abrasive, the second side of the distributing body can be configured, for example, such that a contact adhesive of an abrasive can be temporarily fastened thereto. Alternatively or additionally thereto, the second side of the distributing body can be configured such that it is suitable for producing a hook-loop connection and possesses hooks suitable for this purpose, and/or that it is suitable for the clamping-on of an abrasive, and/or that it is suitable for the adherence of an abrasive by means of van der Waals forces (so-called "gecko effect").

Since the cavities penetrate the distributing body through to its second side, they open out there into dust inlet openings, through which grinding dust generated in the grinding can penetrate. After this, the grinding dust can flow either directly through a suction opening of the supporting plate. This is possible, in particular, when the cavity on the first side of the distributing body opens out directly into one of the suction openings of the supporting plate. Alternatively, the grinding dust can make its way through at least one aperture initially into another aperture, from where it can then flow through a suction opening of supporting plate. The design of the distributing body and, in particular, the presence of the apertures thus allow the grinding dust to be able to pass on the grinding side through a multiplicity of dust inlet openings, so that an even as possible dust extraction is enabled without the supporting plate also having to contain a corresponding number of suction openings.

For example, the mounting can contain at least twice, preferably at least three times, further preferably at least four times, and particularly preferably at least six times as many cavities as suction openings.

The first side of the distributing body can at least partially be connected to or be in contact with the second side of the supporting plate. Alternatively, the first side of the distributing body and the second side of the supporting plate can be congruently configured. In particular, the second side of the supporting plate can connected to the first side of the distributing body in such a way that at least a plurality of, in particular adjacent, cavities and/or a plurality of walls in the distributing body are not limited by the second side of the supporting plate. Preferably, a void volume, which brings together the dust accruing in the grinding operation, can here be configured between the first side of the distributing body and the second side of the supporting plate.

In order that a sufficient stability of the distributing body is ensured, the apertures advantageously do not penetrate the walls along the total thickness of the distributing body. It is certainly conceivable and lies within the scope of the disclosure that the apertures penetrate the walls in the region of the second side of the distributing body or even extend through to the second side of the distributing body. In order, however, that as large a contact surface as possible is present between the second side of the distributing body and the abrasive, at least one, preferably a plurality of, and particularly preferably all apertures penetrate(s) the walls in the region of the first side of the distributing body and extend, in particular, through to the first side of the distributing body.

In order to achieve a satisfactory compromise between stability and flow-through capability, the relationship between the extent of the apertures perpendicular to the first side and/or to the second side of the distributing body and the total thickness of the distributing body in this direction should lie within the range from 30% to 70%, preferably within the range from 40% to 60%, and particularly preferably within the range from 45% to 55%.

Likewise, in order to obtain a satisfactory compromise between stability and flow capability, the walls should have parallel to the first side and/or to the second side of the distributing body a thickness which lies within the range from 1 mm to 5 mm, preferably within the range from 2 mm to 4 mm, particularly preferably within the range from 2.5 mm to 3.5 mm. Self-evidently, not all walls must necessarily have the same thickness.

Preferably, the first side and the second side of the distributing body are substantially flat and oriented parallel to each other. In particular in these cases, the distributing body has perpendicular to these two sides a thickness which lies advantageously within the range from 1 mm to 20 mm, preferably within the range from 2 mm to 12 mm, particularly preferably within the range from 3 mm to 6 mm.

In another variant of the disclosure, the mounting does not necessarily have to possess the above-described apertures. Instead, one, a plurality of, and particularly preferably all cavities can have the form of a cylinder, wherein respectively a base of the cylinder is disposed on the first side and second side respectively of the distributing body. In this way, too, an even and extensive dust extraction can be obtained.

By a cylinder is here understood, in general terms, a cavity which is limited by two substantially mutually parallel bases and an envelope surface. A base of this cylinder is respectively disposed on the first side and second side respectively of the distributing body. On the second side, the dust inlet opening thus has the form of the base of the cylinder. The envelope surface of the cylinder consists of a host of at least substantially mutually parallel sections, which are formed by one or more walls of the distributing body. If these sections run substantially perpendicular to the bases, then a straight cylinder is obtained. However, oblique cylinders are equally conceivable and lie within the scope of the disclosure. Distributing bodies having cavities in the form of cylinders, in particular of straight cylinders, are particularly easily to produce and allow, moreover, an effective dust evacuation.

In further preferred embodiments, the cylinder is even a prism. At least one, preferably a plurality of, and particularly preferably all cavities thus have the form of a prism, i.e. of a cylinder having a base which is formed by a polygon.

With particular advantage, at least one, preferably a plurality of, and particularly preferably all walls at the same time respectively limit(s) two of the prism-shaped cavities, wherein, quite particularly preferably, the walls respectively have a constant thickness. The cavities thus lie "closely packed". This allows a particularly extensive dust extraction.

The polygon can be, in particular, a regular polygon. Quite particularly preferably, the polygon is an equilateral triangle, a square, a regular hexagon or a regular octagon. The particularly preferred form of a regular hexagon leads to a distributing body, the structure of which is based on that of honeycombs. In this structure, respectively three walls meet at a point which forms a common corner of three hexagons. As is known, such a structure is mechanically extremely stable.

Alternatively, the bases of the cylinder can also however be rectangles, circles or ellipses, for example, or can also have the form of a curved slot, for example.

The bases of the cylinders, in particular of the prisms, can have a diameter which lies within the range from 1 mm to 12 mm, preferably within the range from 2 mm to 10 mm, particularly preferably within the range from 3 mm to 6 mm. As the diameter of the base is here understood the diameter of the smallest imaginary circle which contains the base.

The number of cavities can lie within the range from 70 to 300, preferably within the range from 110 to 200, particularly preferably within the range from 140 to 180. Numbers within these ranges are particularly suitable, for example, if the abrasive is configured as a grinding disk having a diameter of 150 mm. The number of suction openings, on the other hand, can lie within the range from 10 to 300, preferably within the range from 15 to 100, particularly preferably within the range from 20 to 40.

In preferred embodiments which are described in still greater detail further below, the supporting plate and/or the distributing body are initially produced separately and are then connected to each other in such a way that the first side of the distributing body is at least partially in contact with the second side of the supporting plate. Alternatively, it is also conceivable, however, for the supporting plate and the distributing body to be configured integral with each other.

The first side of the supporting plate can have at least one fastening element, by means of which it can be fastened to a drive of a grinding machine.

Advantageously, at least one, preferably a plurality of, and particularly preferably all suction openings is or are oriented in alignment with respectively a cavity. As a result of these cavities, a particularly uninhibited dust evacuation can take place. Any further cavities which are oriented in alignment with none of the suction openings are unilaterally closed on the first side of the distributing body by the second side of the supporting plate. According to the disclosure, they are, however, indirectly fluidically connected via at least one of the apertures to a suction opening of another cavity.

With particular advantage, all cavities are congruent to one another, i.e. have, in particular, the same dimensions. A particularly even dust extraction is hereby achieved. In particular, this advantage exists also in the case of the abovementioned honeycomb structure.

However, it is also thoroughly conceivable, and lies within the scope of the disclosure, that the cavities are not all congruent to one another. It is thus conceivable, for example, for a first sort of cavities to have the form of a prism having a regular octagon as the base, and for a second sort of cavities to have the form of a prism having a square as the base.

The supporting plate can, for example, contain or consist of plastic (e.g. PA6.6), metal (e.g. aluminum), glass-fiber reinforced plastic, or other composites and be produced with methods which are known per se. The distributing body advantageously contains or consists of foam (e.g. of polyurethane), rubber or further soft or attenuating plastics.

The distributing body can be surrounded in the outer region by a sealing ring. As a result of such a sealing ring, an undesirable lateral influx of air can be prevented, which would reduce the suction effect. As the outer region is here regarded that part of the surface of the distributing body which is not formed by its first and second side.

A further aspect of the present disclosure relates to a method for producing a mounting as described above. This method contains the following steps:

a) production or provision of a supporting plate having a first side and a second side situated opposite the first side, wherein the supporting plate contains a plurality of suction openings, which penetrate it from its first side to its second side;

b) application of a distributing body to the second side of the supporting plate, so that the distributing body has a first side and a second side situated opposite the first side, wherein the first side of the distributing body is at least partially connected to the second side of the supporting plate and the second side of the distributing body is configured to hold an abrasive, wherein the distributing body contains a multiplicity of cavities, which penetrate the distributing body from its first side to its second side and which are mutually separated by a multiplicity of walls.

The application of the distributing body in step b) can be realized, for example, by spray-coating. Such spray-coating is possible, in particular, when one, a plurality of, and particularly preferably all cavities have the form of a cylinder, wherein respectively a base of the cylinder is disposed on the first side and second side respectively of the distributing body. This allows a cost-effective production, since, in particular, no vinyl film as described above in the prior art has to be produced separately.

At least one wall can have at least one aperture, which connects at least two adjacent cavities one to another, wherein each cavity is fluidically connected to at least one suction opening of the supporting plate directly or indirectly by at least one, preferably precisely one, aperture. If the wall has apertures of this type, the distributing body can initially be produced separately, for example by injection molding, after which it can be fastened to the supporting plate.

A further aspect of the disclosure relates to a grinding system, which contains at least one mounting as described above, as well as at least one, in particular self-adhesive and/or flexible abrasive. The abrasive can have a structure which is known per se. In particular, it can be configured as a flexible abrasive, containing a support which bears abrasive grains fixed with a bonding agent. In order that the advantages materialize, the abrasive, and in particular its support, should be able to be flowed through by grinding dust. For this purpose, the material of the support can already per se be able to be flowed through by grinding dust, as is the case, for instance, for correspondingly configured textile materials or open-cell foams. Alternatively or additionally, a perforation can also be made in a support (for instance of paper or film) which cannot be flowed through per se.

The abrasive can be fastened to the second side of the distributing body. The thus fastened abrasive can then be used to machine a surface.

Finally, the disclosure also relates to the use of a mounting, as has been described above, to hold an, in particular, flexible and/or self-adhesive abrasive, in particular a flexible grinding disk.

BRIEF DESCRIPTION OF THE DRAWINGS

The disclosure is described in greater detail below with reference to figures, which merely represent illustrative embodiments, wherein.

DETAILED DESCRIPTION

Figure 1:
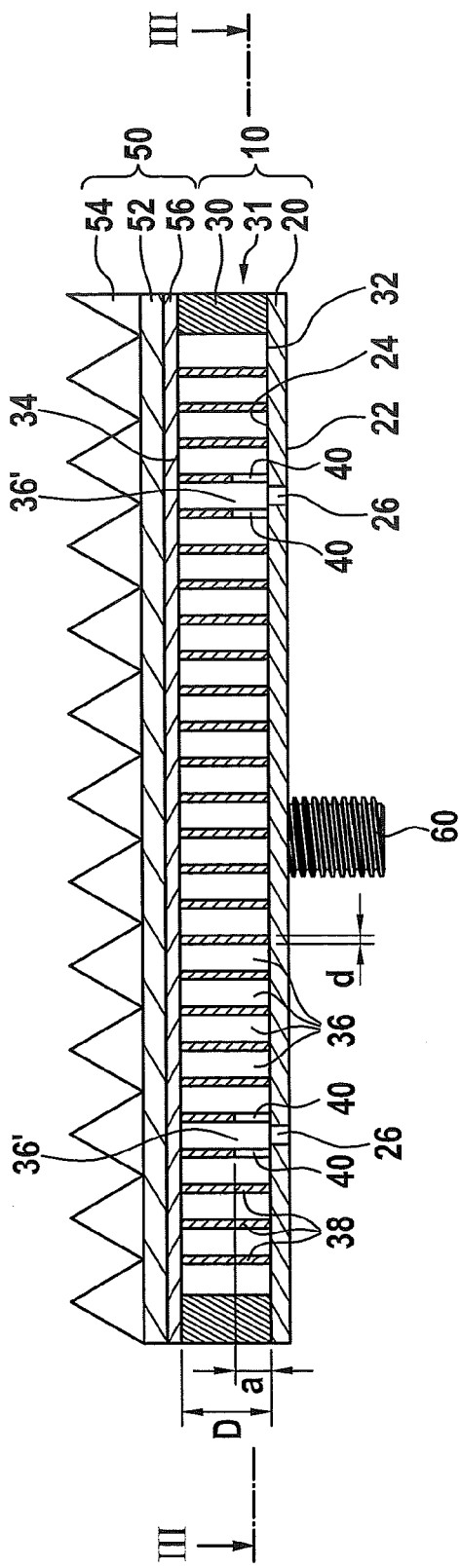
FIG. 1: shows a lateral cross section of a mounting according to the disclosure with a grinding disk held thereon.

FIG. 1 shows a lateral cross section of a mounting 10 according to the disclosure with a flexible grinding disk 50 which is held thereon. The mounting 10 contains, firstly, a supporting plate 20 having a first side 22 and a second side 24 situated opposite the first side 22. The first side 22 of the supporting plate 20 has a fastening element (not represented here), with which the supporting plate can be fastened to a drive 60. In addition, the supporting plate 20 contains a plurality of suction openings 26, which penetrate it from its first side 22 to its second side 24.

The mounting 10 further contains a distributing body 30 having a first side 32 and a second side 34 situated opposite the first side 32. The first side 32 of the distributing body 30 is connected to the second side 24 of the supporting plate 20. The second side 34 of the distributing body 30 is configured to hold the grinding disk 50. In the outer region, the distributing body 30 is surrounded by a sealing ring 31.

The grinding disk 50 contains a support 52, which can consist, for example, of a dust-permeable textile material. On an upper side of the grinding disk 50, abrasive grains 54 are fixed with the aid of a bonding agent (not represented here). On the opposite, lower side, the grinding disk 50 possesses a contact adhesive layer 56, which is temporarily glued onto the second side 34 of the distributing body 30.

Moreover, the distributing body 30 contains a multiplicity of cavities 36, 36', which penetrate it from its first side 32 to its second side 34 and which are mutually separated by a multiplicity of walls 38. On the second side 34 of the distributing body 30, the cavities 36, 36' open out into dust inlet openings. All suction openings 26 in the supporting plate 20 are oriented in alignment with respectively one of the cavities 36' of the distributing body 30. Further cavities 36 are closed off on the first side 32 of the distributing body 30 by the second side 24 of the supporting plate 20. In order also to enable transport of dust from these cavities 36, some of the walls 38 respectively have an aperture 40, which connects two adjacent cavities 36, 36' one to another. In this way, each cavity 36, 36' is fluidically connected directly or indirectly by at least one aperture 40 to at least one suction opening 26 of the supporting plate 20; this is not evident, however, in the simplified representation according to FIG. 1.

Each cavity 36, 36' has the form of a cylinder, or even of a prism, the bases of which can be seen in the following FIGS. 2 to 6. Respectively one of the bases of the cylinder, in particular of the prism, is disposed on the first side 32 and second side 34 respectively of the distributing body 30, wherein the dust inlet openings on the second side 34 have the form of this base.

All apertures 40 penetrate the walls 38 only in the region of the first side 32 of the distributing body 30 and even extend through to this first side 32. This arrangement ensures that the area of the second side 34 of the distributing body 30 is as large as possible in order to ensure the most stable possible adhesive connection to the grinding disk 50.

Perpendicular to its first side 32 and to its second side 34, the distributing body 30 has a thickness D which can lie, for example, within the range from 3 mm to 6 mm. The individual apertures 40 have in this direction an extent a within the range from 1.5 mm to 3 mm. The relationship between the extent a of the overall thickness D of the distributing body 30 here lies preferably within the range from 45% to 55%. Perpendicular to this direction (i.e. parallel to the first side 32 and to the second side 34 of the distributing body 30), the walls 38 have a thickness d, which can lie, for example, within the range from 2.5 mm to 3.5 mm.

The supporting plate 20 can consist, for example, of plastic, e.g. PA6.6. The distributing body 30 can consist, for instance, of a polyurethane foam and can be fastened to the supporting plate 20, for example by spray-coating onto the latter, such as is described in greater detail further below.

Grinding dust which is generated in the grinding can firstly make its way through the grinding disk 50 into the cavities 36. From the cavities 36', which are oriented in alignment with one of the suction openings 26, the grinding dust can escape directly through this suction opening 26. From the other cavities 36, the grinding dust can make its way through one or more apertures 40 into a cavity 36', which is oriented in alignment with a suction opening 26. In this way, a dust evacuation is obtained over almost the entire area, even though the suction openings 26 are not distributed over the whole of the supporting plate 20. The sealing ring 31 prevents a lateral influx of air, which would reduce the suction effect.

Figure 2:
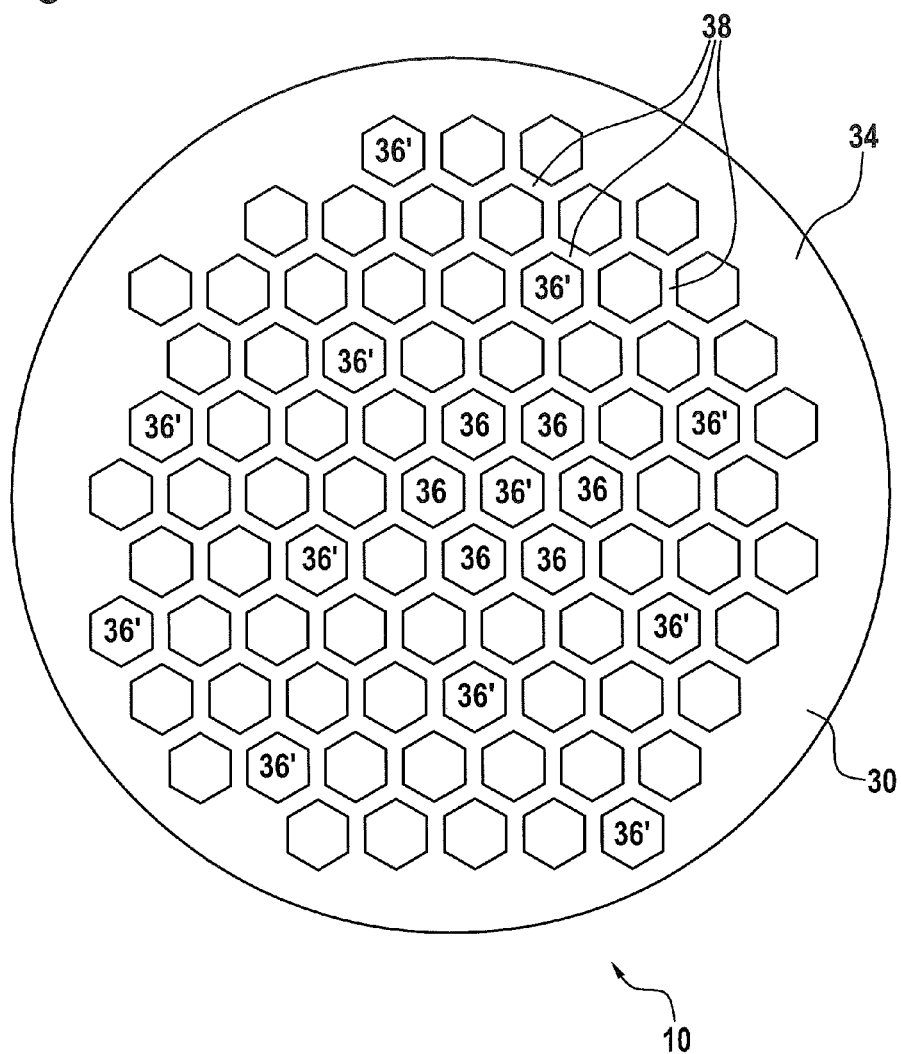
FIG. 2: shows a top view of a first illustrative embodiment of a mounting according to the disclosure.

FIG. 2 shows in a top view the second side 34 of a distributing body 30 in a first embodiment of the mounting 10. The cavities 36 here have the form of a prism having a regular hexagon as the base. These cavities 36 are mutually separated by a multiplicity of walls 38. In this way there is formed a type of honeycomb structure, which, on the one hand, is extremely stable and, on the other hand, enables an extremely even dust evacuation. The cavities (denoted by 36') are oriented in alignment with suction openings 26 of the supporting plate 20. At these places, it is possible to see both through the distributing body 30 and through the supporting plate 20 arranged behind it. The other cavities 36 (which are only partially labeled) are not oriented in alignment with the suction openings 26 of the supporting plate 20. At these places, there is a view through the cavities 36 onto the second side 24 of the supporting plate 20.

Figure 3:
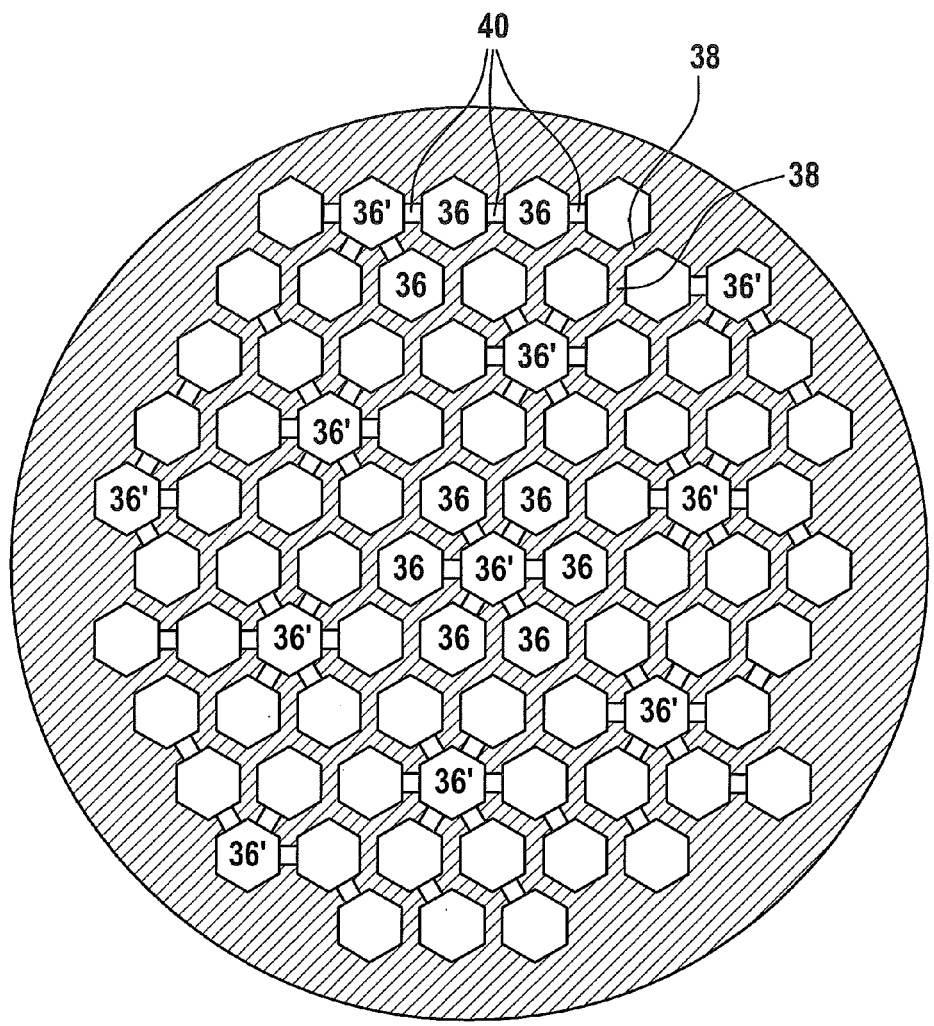
FIG. 3: shows a sectional view through the first illustrative embodiment along the line III-III in FIG. 1.

In FIG. 3 is represented a sectional view to the example from FIG. 2 along the line III-III in FIG. 1. Here, the apertures 40 which penetrate some of the walls 38 are evident. In this way, the cavities 36' are fluidically connected directly to one of the suction openings 26, while the cavities 36 (of which, here too, only some are provided with reference symbols) are fluidically connected indirectly by at least one aperture 40 to at least one cavity 36', and hence to a suction opening 26.

Alternatively, it is also however conceivable and lies within the scope of the disclosure that, unlike in FIGS. 1 and 2, each cavity 36, 36' is oriented in alignment with a suction opening 26. Due to the honeycomb-modeled structure, an even and extensive dust extraction can hereby likewise be achieved.

Figure 4:
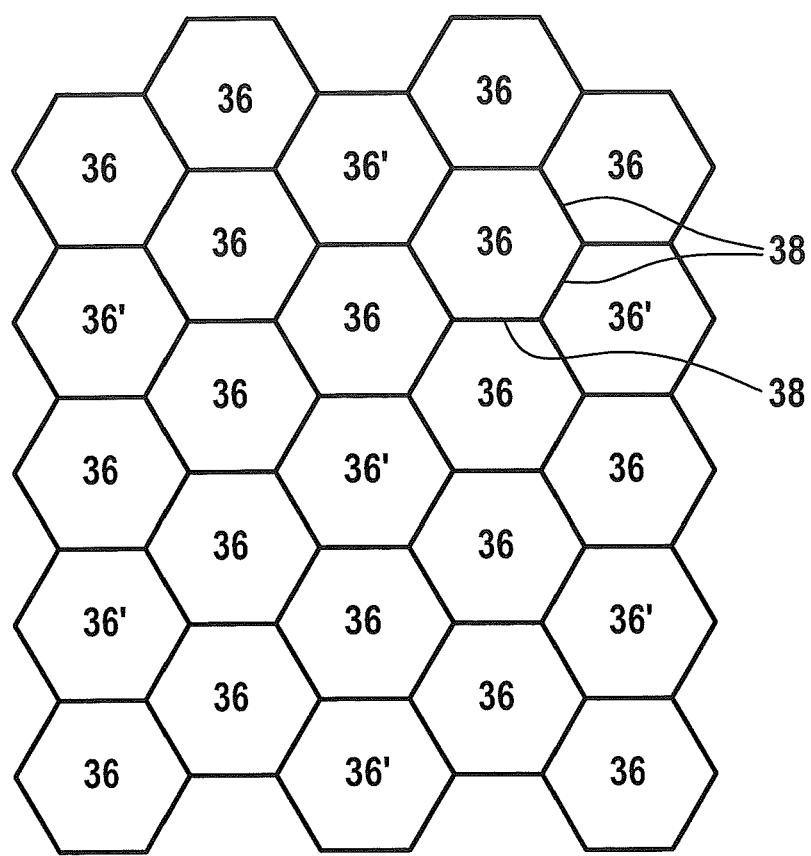
FIG. 4: shows a detail of a top view of a second illustrative embodiment of a mounting according to the disclosure.

FIG. 4 shows schematically a detail of a top view of a second illustrative embodiment of a mounting according to the disclosure. Here too, the cavities which are oriented in alignment with a suction opening of the supporting plate are denoted by 36'. The further cavities 36 are fluidically connected via apertures 40 (see FIG. 5) to one of the cavities 36', and hence also to one of the suction openings of the supporting plate.

Figure 5:
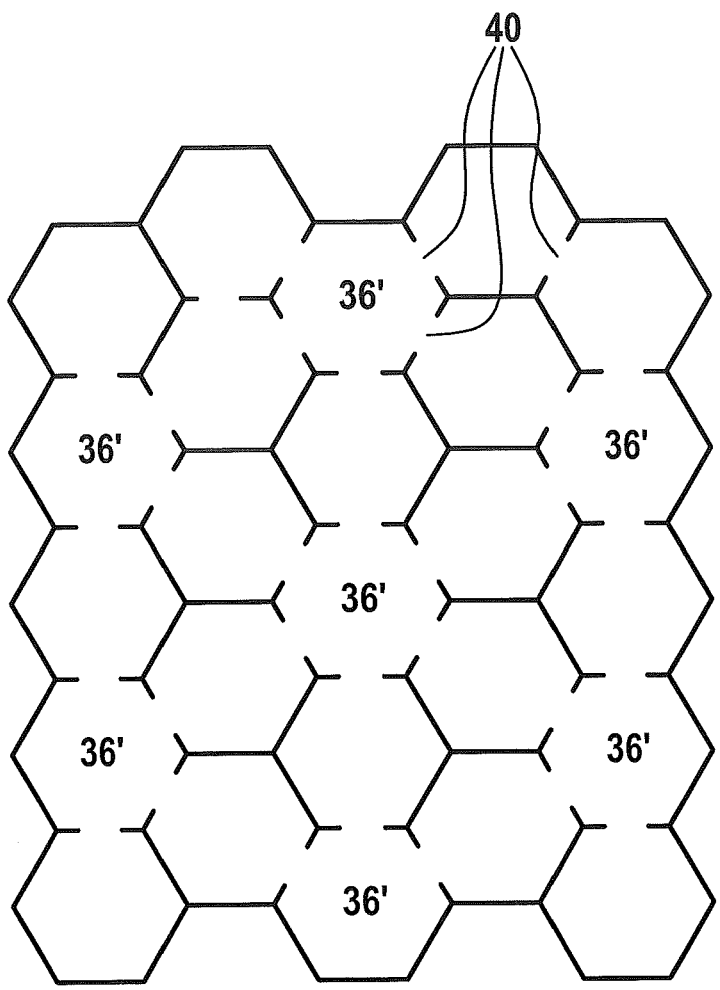
FIG. 5: shows a sectional view through the second illustrative embodiment along the line III-III in FIG. 1.

In FIG. 5, analogously to FIG. 3, is represented a sectional view of the example shown in FIG. 4, in which view the apertures 40 are evident. In contrast to the illustrative embodiment represented in FIGS. 2 and 3, each of the cavities 36 is here fluidically connected to two cavities 36'. Although more suction openings hereby become necessary in the supporting plate, a still more even dust extraction can also hereby be produced.

Figure 6:
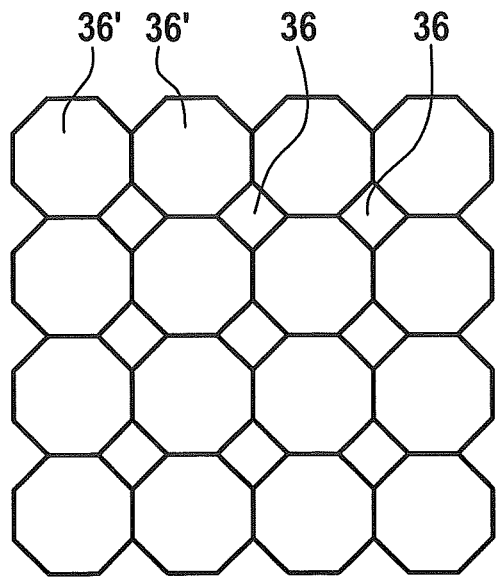
FIG. 6: shows a detail of a top view of a third illustrative embodiment of a mounting according to the disclosure.

In FIG. 6, a detail of a top view of a third illustrative embodiment of a mounting according to the disclosure is represented. Here too, all the cavities 36, 36' are configured as prisms.

However, the bases of some of the cavities 36' are configured as regular octagons, while the remaining cavities 36 have bases in the form of squares, which are disposed between the octagons. The cavities denoted by 36' are oriented in alignment with suction openings of the supporting plate (not represented here).

Figure 7:
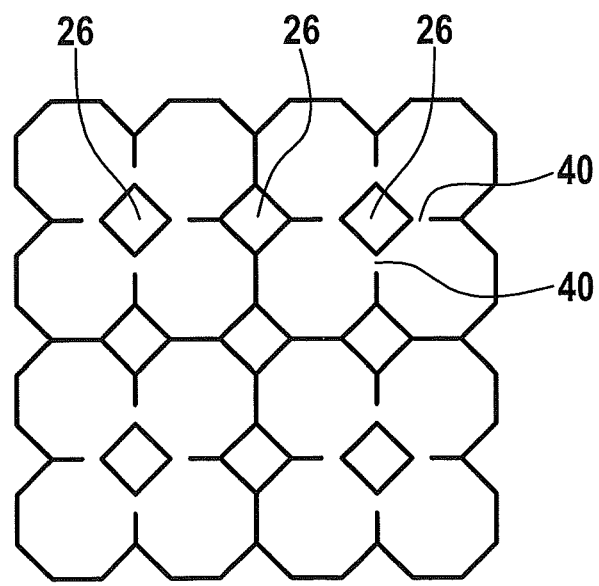
FIG. 7: shows a sectional view through the third illustrative embodiment along the line III-III in FIG. 1.

FIG. 7 shows, analogously to FIG. 3, a sectional view of the example shown in FIG. 6, in which view the suction openings 26 contained in the supporting plate are visible.

Figure 8:
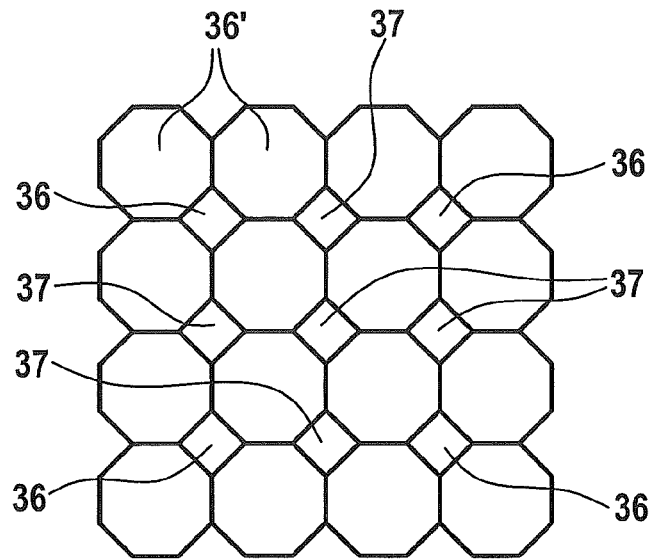
FIG. 8: shows a detail of a top view of a fourth illustrative embodiment of a mounting according to the disclosure.
Figure 9:
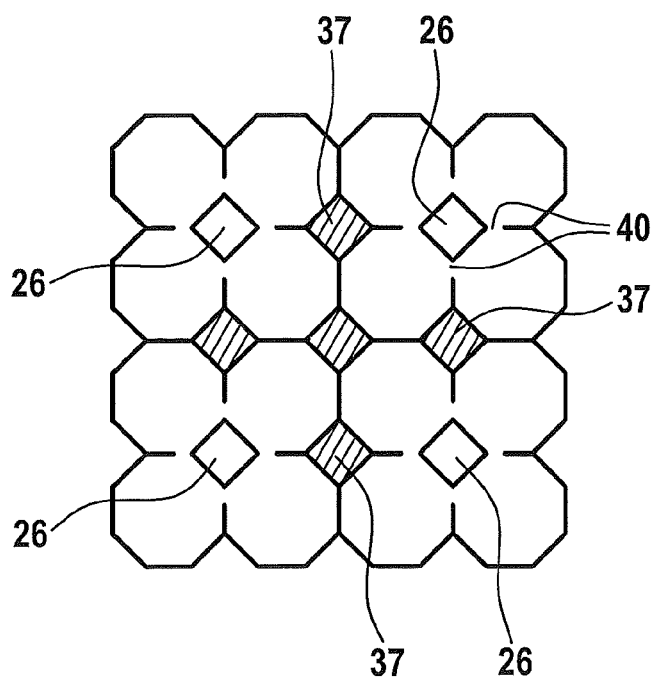
FIG. 9: shows a sectional view through the fourth illustrative embodiment along the line III-III in FIG. 1.

In FIG. 8, a detail of a top view of a fourth illustrative embodiment of a mounting according to the disclosure is shown. This contains, apart from cavities 36' having bases in the form of regular octagons and cavities 36 having bases in the form of squares, also solid cylinders 37 having bases in the form of squares, through which no dust extraction takes place. FIG. 9 shows a corresponding sectional view.

What is claimed is:

1. A mounting element for holding an abrasive member, comprising:
   a supporting plate that includes:
   a first side;
   a second side opposite the first side; and
   a plurality of suction openings which penetrate from the first side of the supporting plate to the second side of the supporting plate; and
   a distributing body that includes:
   a first side, at least a portion of the first side in contact with the second side of the supporting plate;
   a second side that is opposite the first side of the distributing body, and that is configured to hold an abrasive member; and a plurality of cavities which penetrate from the first side of the distributing body to the second side of the distributing body, and which are respectively separated by a plurality of walls, wherein at least one of the walls includes at least one aperture that connects at least two adjacent cavities to each other;

wherein the mounting element includes at least twice as many cavities in the plurality of cavities as suction openings in the plurality of suction openings.

2. The mounting element according to claim 1, wherein each of the plurality of cavities is respectively directly or indirectly fluidically connected to at least one of the suction openings via the at least one aperture.

3. The mounting element according to claim 1, wherein the at least one aperture penetrates the at least one wall in a region of the first side of the distributing body and extends through the at least one wall to the first side of the distributing body.

4. The mounting element according to claim 1, wherein an extent of the at least one aperture in a direction perpendicular to at least one of the first and second sides of the distributing body is in a range from 30% to 70% of a size of a thickness of the distributing body perpendicular to at least one of the first and second sides of the distributing body.

5. The mounting element according to claim 1, wherein the distributing body has a thickness perpendicular to at least one of the first and second sides of the distributing body that is within a range of 1 mm to 20 mm.

6. The mounting element according to claim 1, wherein at least one of the plurality of cavities has a substantially cylindrical shape with a base disposed on the first side of the distributing body and a top disposed on the second side of the distributing body.

7. The mounting element according to claim 1, wherein at least one of the cavities has a prism shape with a base of the prism disposed on the first side of the distributing body and a top disposed on the second side of the distributing body.

8. The mounting element according to claim 7, wherein the base of the prism shape is selected from the group consisting of an equilateral triangle, a square, a regular hexagon, and a regular octagon.

9. The mounting element according to claim 1, wherein the each of the plurality of walls has a thickness parallel to at least one of the first and second sides of the distributing body that lies in a range from 1 mm to 5 mm.

10. The mounting element according to claim 1, wherein the plurality of cavities includes a number of cavities in a range from 70 to 300.

11. The mounting element according to claim 1, wherein the plurality of suction openings includes a number of suction openings in a range from 10 to 300.

12. The mounting element according to claim 1, wherein at least one of the suction openings is oriented in alignment with respect to one of the cavities.

13. The mounting element according to claim 1, wherein:
the mounting element is disposed in a grinding system; and
the grinding system further includes at least one abrasive member mounted via the mounting element.

14. The mounting element according to claim 1, wherein each cavity in the plurality of cavities has a shape that is congruent to the shape of each other.

15. The mounting element according to claim 1, wherein at least one first cavity in the plurality of cavities has a shape that is not congruent with at least one second cavity in the plurality of cavities.

16. The mounting element according to claim 15, wherein:
the of the at least one first cavity has a base with an octagon shape; and
the at least one second cavity has a base with a square shape.

17. The mounting element according to claim 1, further comprising:
a sealing ring that surrounds an outer region of the distributing body.

18. The mounting element according to claim 1, wherein the supporting plate includes at least one of a textile material and an open-cell foam.

19. A grinding system having the mounting element according to claim 1, comprising at least one of a self-adhesive element and a flexible abrasive element.

20. A method for producing a mounting element, comprising:
producing a supporting plate that includes a plurality of suction openings which penetrate from a first side of the supporting plate to a second side of the supporting plate opposite the first side;
producing a distributing body that includes a plurality of cavities which penetrate from a first side of the distributing body to a second side of the distributing body opposite the first side, and which are respectively separated by a plurality of walls, wherein:
the second side of the distributing body is configured to hold an abrasive member;
at least one of the plurality of walls includes at least one aperture that connects at least two adjacent cavities to each other; and
the distributing body includes at least twice as many cavities in the plurality of cavities as suction openings in the plurality of suction openings; and
connecting a at least a portion of the first side of a distributing body to the second side of the supporting plate.

21. A method of using a mounting element, comprising:
mounting a flexible self-adhesive grinding disk onto a second side of a distributing body configured to hold the flexible self-adhesive grinding disk, wherein:
at least a portion of a first side of the distributing body opposite the second side of the distributing body is in contact with a second side of a supporting plate;
the supporting plate includes a plurality of suction openings that penetrate from the second side of the supporting plate to a first side of the supporting plate that is opposite the second side of the supporting plate;
the distributing body includes a plurality of cavities which penetrate from the first side of the distributing body to the second side of the distributing body, and which are respectively separated by a plurality of walls;
at least one of the plurality of walls includes at least one aperture that connects at least two adjacent cavities to each other; and
the distributing body includes at least twice as many cavities in the plurality of cavities as suction openings in the plurality of suction openings.

* * * * *